Patented Feb. 21, 1939

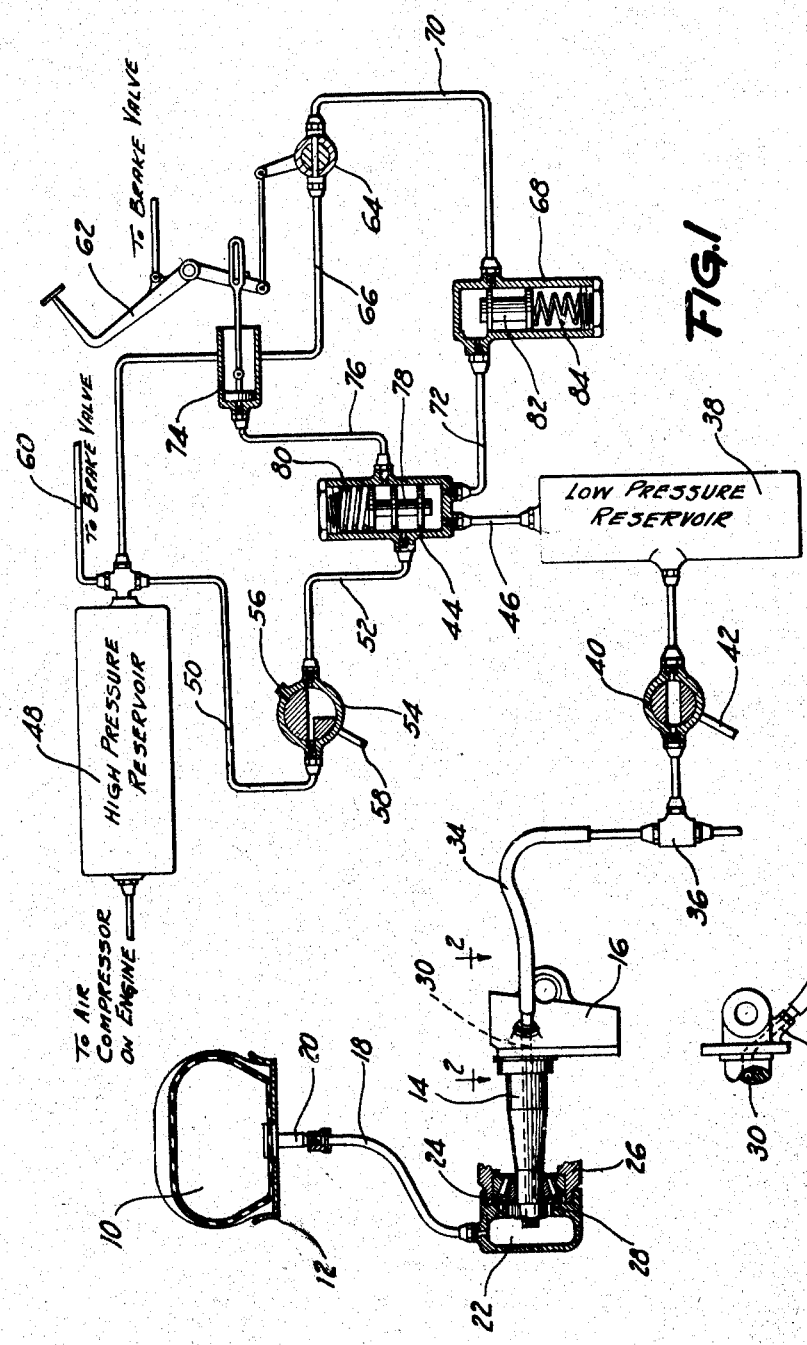

2,148,246

UNITED STATES PATENT OFFICE 2,148,246

TIRE INFLATING AND BRAKE OPERATING MECHANISM

Roy S. Sanford, New York, N. Y., assignor to Bendix Products Corporation, South Bend, Ind., a corporation of Indiana Application September 27, 1935, Serial No. 42,421

5 Claims. (Cl. 188—110)

This invention relates to safety features for automotive vehicles and is particularly applicable to large vehicles such as busses and trucks, et cetera.

An object of the invention is to eliminate to a large extent the hazard created by rapid deflation in a front tire of such vehicle, as when a front tire is punctured or blown out. By reason of the weight of such large vehicles rapid deflation in one of the front or steerable tires creates a heavy drag on the steering gear which in many instances is difficult for the driver to overcome. My invention provides for the reduction in air pressure in both front tires if one tire develops a leak, in this way counterbalancing the leakage to a substantial extent and somewhat equalizing the drag on the steering gear.

An important feature of the invention, and one associated with the object above specified, resides in the arrangement whereby the pressure in one tire counterbalances that in the opposite tire at all times. In this way equalization of pressures in the tires is assured at all times and unequal wear by virtue of haphazard inflation of one or both of the tires is to a large extent eliminated.

It will be apparent that by virtue of this equalization of pressure at all times any given leakage from one tire will take twice as long to deflate the tire as would be the case if the pressure in the other steerable tire were not available for counterbalancing purposes.

Another major object of the invention is to arrange compressed air mechanism in such manner that it is available to apply the brakes of the vehicle automatically upon deflation of the tires to any predetermined pressure and also to reinflate the tires or to prolong the period of elapsed time after development of a leak before serious deflation results. It is an object therefore to provide means to delay the effect of a blowout, and thereby provide sufficient time to get the car under control.

My invention may be associated with air brakes of any conventional type and the ordinary compressed air source utilized therefor, or special mechanism may be provided and the air pressure utilized to apply mechanically actuated brakes.

Various other objects and meritorious features of the invention will become apparent from the following description taken in conjunction with the drawing, wherein:

Figure 1 is an illustration, largely diagrammatic, of the improved mechanism; and Figure 2 is a plan view along line 2—2 of Figure 1.

Referring now to the drawing, numeral 10 represents a tire mounted in the customary fashion upon a wheel 12, which wheel is rotatably mounted upon the conventional front spindle 14 integral with the steering knuckle 16. An air line 18 extends from the tire valve 20 to the hollow hub cap 22 of the wheel which, in combination with a washer 24 held under the spindle nut 26 and a resilient ring or packing gland 28 positioned in the hub cap, forms a rotatable leak proof connection with a drilled passage 30 in the spindle. This drilled passage terminates in a boss 32 to which is secured one end of a flexible conduit 34, the other end of said conduit being connected to a three-way fitting 36.

Conduit 34 extends to said fitting from the other steering knuckle in the same manner as described above, and the third port of the three-way fitting is connected to a low pressure tank 38 through a so-called open and shut valve 40, which may be positioned in any convenient location and which is manually operable through the arm 42.

A pressure sensitive valve 44 is connected to the low pressure tank through a conduit 46. The low pressure tank is also in communication with a high pressure reservoir 48, the pressure in which may be maintained in suitable fashion, as by a compressor on the vehicle engine, through air lines 50 and 52 between which is interposed a valve 54 which is provided with an air vent 56. This valve is preferably located on the dash of the vehicle within easy reach of the driver and is manually operable by means of a lever 58 to open the line between the high pressure reservoir and the pressure sensitive valve or to close such line. Closing movement likewise functions to open the vent 56 to communication with the pressure sensitive valve 44 through line 52.

Where air brakes are utilized on the vehicle an air line 60 may be utilized to connect the high pressure reservoir with brake actuating mechanism and suitable valves associated with the air line 60 may be coupled with the manually operable brake pedal 62 to control the action of the brakes. However, the invention may be utilized with equal effectiveness where mechanical brakes are involved. The high pressure reservoir 48 is connected to an open and shut valve 64 through conduit 66 and communication between said valve 64 and a reducing valve 68 is provided through conduit 70. Reducing valve 68 and pressure sensitive valve 44 are connected by conduit 72.

A brake actuating piston assembly is indicated at 74, the piston rod having a one-way connection with the brake pedal 62 by means of the pin and slot connection 63. Said piston assembly is in communication with the pressure sensitive valve 44 through a conduit 76. It will be apparent that the brakes may be manually applied by virtue of the one-way connection without actuating the piston assembly 74.

The pressure sensitive valve 44 includes a triple spool valve 78 operable to constantly close the upper portion of the valve casing from communication with lines 46 and 72 and also operable on sliding movement thereof to establish communication between lines 62 and 76. It will be apparent that the pressure in the tires and the low pressure reservoir 38 will be constantly exerted against one end of the spool valve 78, which pressure is resisted by a coil spring 80 seated between the opposite end of the spool valve and the corresponding end of the valve casing. The coil spring 80 is of a strength which causes the establishment of communication between lines 62 and 76 whenever the pressure at the other end of spool valve 78, in other words the pressure in the tires and low pressure reservoir 38, falls below a predetermined value.

The reducing valve 68 includes a double spool valve 82 which is seated upon a coil spring 84, the other end of which spring seats upon the extremity of the valve casing. The strength of spring 84 is such that when the pressure in the tires and low pressure reservoir falls below said predetermined value, or any predetermined value, the spool valve 82 is moved upwardly to establish communication with the high pressure reservoir 48 through line 70. Of course, such communication can only be established when the open and shut valve 64 is in the position illustrated, where the brakes are off.

The operation of the safety mechanism will be apparent from the foregoing description. When a leak in either tire develops the air in the other tire is automatically utilized to equalize the pressure in the two by reason of the air line maintaining constant communication between the two. Assuming that the valve 46 is in open position as illustrated, the pressure sensitive valve 44 will operate when the pressure in the tires has fallen to a predetermined value to establish communication between the high pressure tank 48 and the brake actuating piston assembly 74 to immediately apply the brakes. It will be apparent that the spring 80 of the pressure sensitive valve may be lighter than spring 84 in reducing valve 68, and under such circumstances the reducing valve would function to maintain sufficient pressure in the tire from the high pressure reservoir to continue operation of the vehicle so long as the leak was not sufficient to require greater replacement than the high pressure tank could conveniently supply. When the high pressure tank was exhausted too rapidly because of the size of the leak, the pressure sensitive valve 44 would function as hitherto described to apply the brakes and stop the vehicle. At the same time communication of the high pressure tank to the tire would be shut off by the automatic closing of the open and shut valve 64.

To release the brakes when so automatically applied by the pressure in the high pressure tank it is only necessary to move the lever 58 to the right for the purpose of venting piston assembly 74 to air through vent 56, at the same time closing off the air passage between the high pressure tank and the said piston assembly. When the tire has been changed the lever 58 may be again moved to the position illustrated in the drawing, the brakes having been released, and the high pressure tank 48 may be utilized to reinflate the tires through lines 66, 70, and reducing valve 68. Where, under emergency conditions, it seems preferable to utilize the high pressure tank to maintain inflation of the tire as long as possible rather than to utilize said tank for applying the brakes, the lever 58 of valve 54 may be shifted to the right when the leakage or blowout occurs, thereby preventing operation of the piston assembly 74 and maintaining communication through line 70 between the high pressure tank and the tires.

While certain mechanism for accomplishing the desired functions has been illustrated in the accompanying drawing, various modifications will be apparent to those skilled in the art and for that reason I wish to limit the invention only by the scope of the appended claims.

I claim:

1. In combination with a vehicle having a plurality of road engaging pneumatic tires, normally open air lines providing communication therebetween to equalize the pressures therein, a pressure tank, brake applying means, actuating means coupled with said brake applying mechanism and said tank for operating the former, and means comprising a spring loaded floating valve member operable on deflation of said tires below a predetermined value for rendering said actuating means operative.

2. In combination with a road engaging pneumatic tire and a brake mechanism, a pressure tank, and means comprising a spring loaded floating valve member and means operable by said brake mechanism, operable on deflation of said tire below a predetermined value to establish communication between said tank and said tire to bring the inflation pressure back to said predetermined value.

3. In an automotive vehicle provided with a road engaging pneumatic tire and brake applying mechanism, means for maintaining the inflation pressure of said tire above a predetermined amount and for actuating said brake applying mechanism in the event the inflation pressure is lowered to a predetermined amount, said means including a pressure tank, fluid transmitting means interconnecting said tank and tire, a pressure sensitive valve and a reducing valve connected in series in said fluid transmitting means, one of said valves being automatically operable, when the inflation pressure reaches a predetermined amount, to effect an operation of said brake applying mechanism.

4. In an automotive vehicle provided with a road engaging pneumatic tire and brake applying mechanism including a pressure differential operated motor, means for maintaining the inflation pressure of said tire above a predetermined value and for actuating said brake applying mechanism in the event the inflation pressure is lowered to a predetermined amount, said means including a pressure tank, fluid transmitting means interconnecting said tank and tire, a pressure sensitive valve and a reducing valve connected in series in said fluid transmitting means, one of said valves being automatically operable, when the inflation pressure reaches a predetermined amount, to effect an operation of said pressure differential operated motor to apply the brakes, together with manually operable valve means operable to deenergize said motor to effect a release of the brakes.

5. In an automotive vehicle provided with a road engaging pneumatic tire and brake applying mechanism, means for (1) maintaining the inflation pressure within said tire at or above a predetermined amount in the event of a blow-out of said tire and (2) automatically applying the brakes of the vehicle should said inflation pressure drop to or below a predetermined amount, said means including a power means for applying the brakes and further including a reducing valve automatically operable, when the inflation pressure reaches a predetermined amount, to render the first-mentioned means operable to maintain the inflation pressure at or above a predetermined amount, and further including a pressure sensitive valve automatically operable at a predetermined inflation pressure of the tire to effect an operation of the first-mentioned means to apply the brakes of the vehicle.

ROY S. SANFORD.